US008446439B1

(12) United States Patent
Brothers et al.

(10) Patent No.: US 8,446,439 B1
(45) Date of Patent: May 21, 2013

(54) APPARATUS AND METHOD FOR SINGLE PASS BLOB ANALYSIS OF HIGH FRAME RATE VIDEO

(75) Inventors: Timothy J. Brothers, Ridgecrest, CA (US); Ronald N. Prusia, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 620 days.

(21) Appl. No.: 12/536,882

(22) Filed: Aug. 6, 2009

(51) Int. Cl.
*G09G 5/02* (2006.01)

(52) U.S. Cl.
USPC .......................................... 345/694

(58) Field of Classification Search
USPC .................. 345/149, 152, 612, 614, 694–698
See application file for complete search history.

(56) References Cited

U.S. PATENT DOCUMENTS

| 7,912,286 | B2 * | 3/2011 | Ozaki et al. ................... 382/180 |
| 2007/0248266 | A1 * | 10/2007 | Matsuno ....................... 382/180 |
| 2009/0028438 | A1 * | 1/2009 | Prusia ........................... 382/204 |

* cited by examiner

*Primary Examiner* — Alexander Eisen
*Assistant Examiner* — Robin Mishler
(74) *Attorney, Agent, or Firm* — Christopher L. Blackburn

(57) ABSTRACT

An apparatus and method for performing BLOB analysis. BLOB analysis generally encompasses image processing techniques designed to classify data into BLOBs and calculate statistics for each BLOB.

5 Claims, 2 Drawing Sheets

APPARATUS AND METHOD FOR SINGLE PASS BLOB ANALYSIS OF HIGH FRAME RATE VIDEO

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefore.

FIELD

The invention generally relates to BLOB analysis. BLOB analysis generally encompasses image processing techniques constructed to classify data into BLOBs and calculate statistics for each BLOB.

It is to be understood that the foregoing and the following detailed description are exemplary and explanatory only and are not to be viewed as being restrictive of the present invention, as claimed. Further advantages of this invention will be apparent after a review of the following detailed description of the disclosed embodiments, which are illustrated schematically in the accompanying drawings and in the appended claims.

DETAILED DESCRIPTION OF THE EMBODIMENTS OF THE INVENTION

Embodiments of the invention generally relate to BLOB analysis. BLOB analysis generally encompasses image processing techniques constructed to classify data into binary large objects ("BLOBs") and Calculate Statistics for each BLOB.

Embodiments of the invention include a plurality of field programmable gate arrays configured to perform a method including receiving at least one frame of video data from an external source, the frame(s) of video data having a plurality of pixels. Embodiments further include providing for two dimensional processing of the frame(s) of video data so as to define a pixel location for each of the plurality of pixels contained within the frame(s) of video data. Embodiments further include providing logic signals which indicate an end of a line of video data and an end of the frame(s) of video data. Embodiments further include processing each of the frame(s) of video data including the pixel locations for each pixel within the frame(s) of video data, and the logic signals which indicate the end of the line of video data and the end of the frame(s) of video data. Embodiments further include determining when each of the pixels within the frame(s) of video data is a BLOB pixel, which indicates the presence of a target within the frame(s) of video data. Embodiments further include processing each of the plurality of pixels in the frame(s) of video data in groups of four pixels, wherein a group of four pixels being processed is a current pixel group, each current pixel group consisting of two pixels contained on a Last Line BLOB Info. signal, the current pixel group's Current Pixel, and the current pixel group's Last Pixel.

Embodiments further include determining when the Current Pixel is part of a BLOB group representing a target. Embodiments further include assigning an ID number to the BLOB group representing a target. Embodiments further include determining when the Current Pixel is part of a BLOB group representing a target distinct from each of any previously identified target. Embodiments further include determining when the Current Pixel is part of a BLOB group representing any previously identified target. Embodiments further include determining when the current pixel group comprises pixels from BLOB groups having different assigned ID numbers. Embodiments further include determining when a BLOB group under consideration does not contain any additional pixel(s) in the frame of video data.

Figure 1:
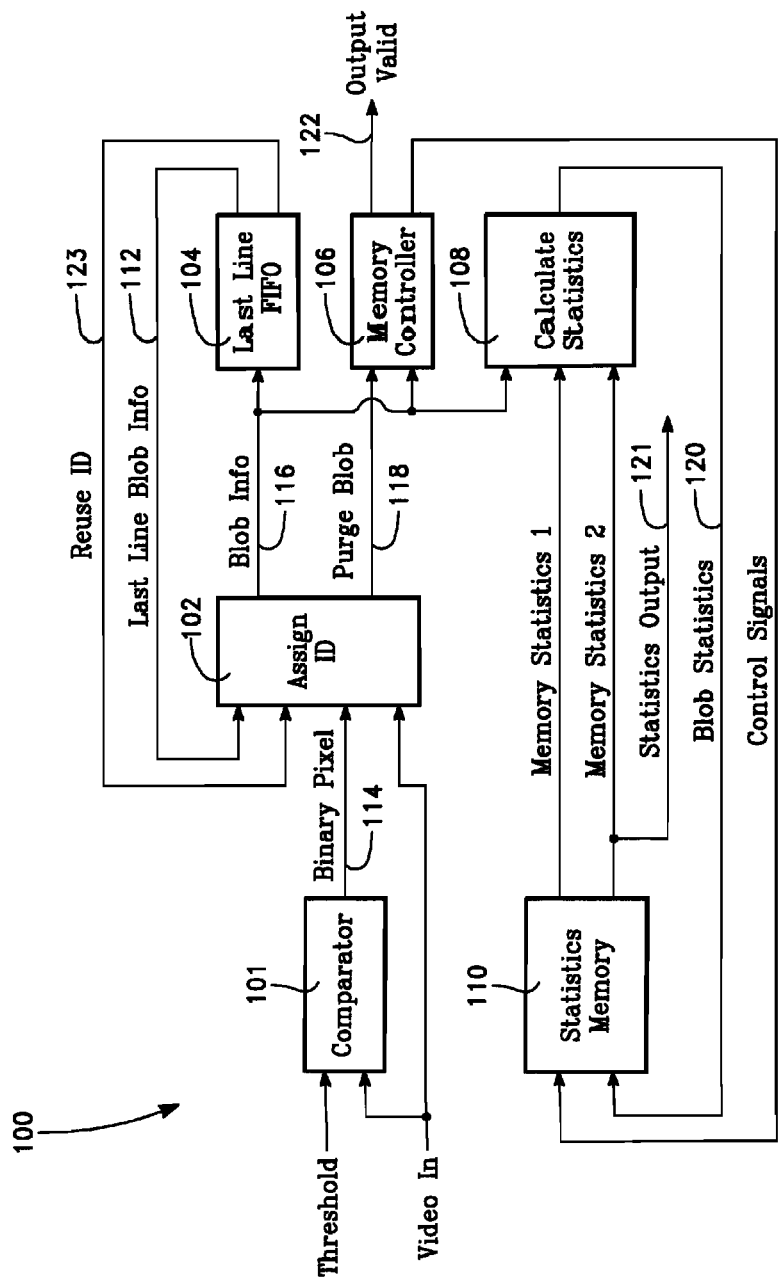
FIG. 1 is a high level flow chart of one embodiment of the invention.

Referring to FIG. 1, there is shown a block diagram of the apparatus/electronics circuit 100 for BLOB image analysis in real time which includes embodiments of the invention. BLOB image analysis apparatus 100 has six major functional blocks illustrated in FIG. 1. The six major functional components are the Comparator, 101 in FIG. 1, the Assign ID, 102, the last line memory ("Last Line FIFO") 104, the Memory Controller 106, Calculate Statistics 108, and Statistics Memory 110. The pixel data being processed is in the form of a raster scan including a frame of pixel data, which is generated using a horizontal sync, vertical sync, and video stream. The frame size used in the present invention is 20 by 20, with a target resolution of 640 by 480, although embodiments of the invention can be made to be compatible with any frame size. The apparatus/method analyzes pixels in the image frame consecutively across each row and consecutively from the top row to the bottom row. In this embodiment, the pixels are analyzed from left to right across a row.

Assign ID, 102 in FIG. 1, operates as a controller for circuit 100 which uses pipelining of video data to perform signal processing. This is required to compensate for the synchronous behavior of Statistics Memory, 110 in FIG. 1, providing a means for examination of multiple pixels during each line.

Assign ID, 102 in FIG. 1, keeps track of all the identification numbers that have been assigned and the IDs that are available for use. It also examines/processes a group of four pixels to determine the required operation of the system. Based in part on the group type, active pixels (pixels that have passed through the Comparator, 101 in FIG. 1, and have met the pre-determined threshold value, therefore being assigned a binary pixel value is 1), are either assigned a new BLOB ID # or added to a previously established BLOB (therefore assigned a previously generated BLOB ID #). Further, the system, where applicable, merges two BLOBs together, resulting in a single BLOB (a single BLOB ID #), or purges a BLOB, i.e., pushes a BLOB out of the system. Groups are analyzed in a 2 by 2 configuration—represented graphically as:

TABLE 1

| 1 | 2 |
| 3 | 4 |

Note that all pixels are binary representations of a threshold pixel value.

With reference to Table 1, "Pixel 1" and "Pixel 2" are found in the Last Line BLOB Info, 112 in FIG. 1, {note that when the row in which the Current Pixel is located is the first row analyzed, the Last Line Info (pixels 1 and 2 in the 2 by 2 configuration) is set to 0}. "Pixel 4" in Table 1 is the pixel under examination (the "Current Pixel"), otherwise referred to as the Binary Pixel 114 in FIG. 1, which is an input signal to Assign ID, 102 in FIG. 1. "Pixel 3" in Table 1 is the "Last Pixel", which is a value stored by Assign ID, 102 in FIG. 1, in a register. The Last Pixel value is the Current Pixel (Pixel 4) value, 114 in FIG. 1, delayed by one clock tick and is stored in Assign ID 102. Current Pixel BLOB ID is the BLOB ID that is assigned to the Current Pixel.

Figure 2:
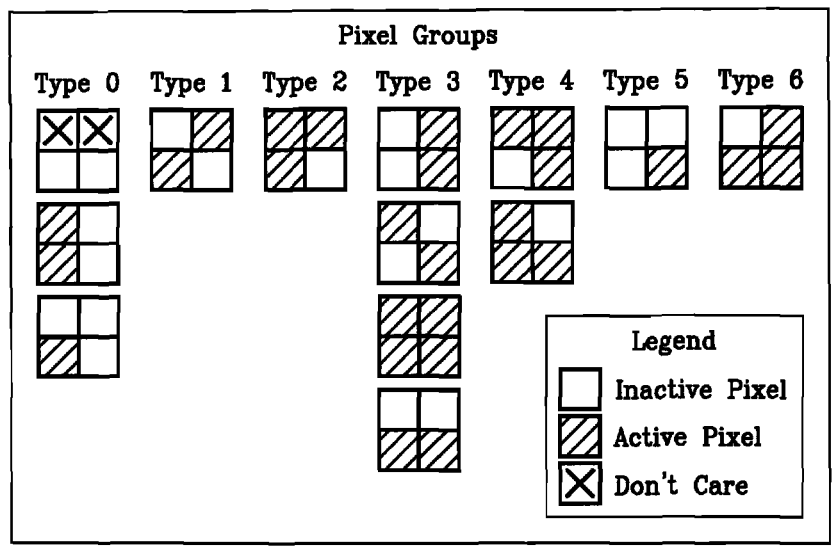
FIG. 2 is a chart of the possible pixel group types.

Assign ID, 102 in FIG. 1, has two outputs—the BLOB Info. signal, 116 in FIG. 1, and the Purge BLOB signal 118. The BLOB Info signal 116 includes the group type (which is determined as illustrated in FIG. 2 and described infra.), the BLOB IDs of the Current Pixel, and the pixel intensity of the incoming pixel. The Purge BLOB signal, 118 in FIG. 1, tells the Memory Controller, 106 in FIG. 1, that the BLOB identified in the BLOB Info signal, 116 in FIG. 1, needs to be outputted from the system. Assign ID, 102 in FIG. 1, and the Last Line FIFO, 104 in FIG. 1, must agree that the BLOB is ready to be outputted for the Purge BLOB signal, 118 in FIG. 1, to be asserted.

With reference to FIG. 2 and Table 1, the current pixel group is/presents a group type 0 situation when the Current Pixel (Pixel 4) is inactive and
1) the Last Pixel (Pixel 3) is inactive (Type 0a);
2) Pixel 2 is inactive (Type 0b); OR
3) both the pixels in the Last Line BLOB Info (Pixel 1 and Pixel 2) are inactive (Type 0c).

With reference to FIG. 2 and Table 1, the current pixel group is/presents a group type 1 situation when the Current Pixel (Pixel 4) is inactive, the Last Pixel (Pixel 3) is active, Pixel 2 is active, and Pixel 1 is inactive. With reference to FIG. 2 and Table 1, the current pixel group is/presents a group type 2 situation when the Current Pixel (Pixel 4) is inactive, the Last Pixel (Pixel 3) is active, Pixel 2 is active, and Pixel 1 is active.

With reference to FIG. 2 and Table 1, the current pixel group is/presents a group type 3 situation when:
1) the Current Pixel (Pixel 4) is active, the Last Pixel (Pixel 3) is inactive, Pixel 2 is active, and Pixel 1 is inactive (Type 3a);
2) the Current Pixel (Pixel 4) is active, the Last Pixel (Pixel 3) is inactive, Pixel 2 is inactive, and Pixel 1 is active (Type 3b);
3) the Current Pixel (Pixel 4) is active, the Last Pixel (Pixel 3) is active, Pixel 2 is active, and Pixel 1 is active (Type 3c); OR
4) the Current Pixel (Pixel 4) is active, the Last Pixel (Pixel 3) is active, Pixel 2 is inactive, and Pixel 1 is inactive (Type 3d).

With reference to FIG. 2 and Table 1, the current pixel group is/presents a group type 4 situation when the Current Pixel (Pixel 4) is active and:
1) the Last Pixel (Pixel 3) is inactive, Pixel 2 is active, and Pixel 1 is active (Type 4a); OR
2) the Last Pixel (Pixel 3) is active, Pixel 2 is inactive, and Pixel 1 is active (Type 4b).

With reference to FIG. 2 and Table 1, the current pixel group is a group type 5 situation when the Current Pixel (Pixel 4) is active, the Last Pixel (Pixel 3) is inactive, Pixel 2 is inactive, and Pixel 1 is inactive.

With reference to FIG. 2 and Table 1, the current pixel group is/presents a group type 6 situation when the Current Pixel (Pixel 4) is active, the Last Pixel (Pixel 3) is active, Pixel 2 is active, and Pixel 1 is inactive.

When the current pixel group is a group type 1 or 6 situation, Assign ID, 102 in FIG. 1, determines whether Pixel 2 and the Last Pixel (Pixel 3) have different IDs. When they have different IDs, the BLOBs need to be merged, so the "replace_b_with_a" signal is set high (meaning it is set equal to a logic value of 1).

A BLOB is formed when active pixels are next to or adjacent to each other. This includes pixels which are adjacent in a horizontal direction, in a vertical direction, and/or diagonally. BLOB statistics are maintained for all active BLOBs. A BLOB is active ("Active BLOB") when the Last Line FIFO or Assign ID includes a pixel with an ID of said BLOB. Calculate Statistics 108 calculates the statistical information. In one embodiment of the invention there are 9 BLOB statistics being collected on each of the targets. The entire system runs at the pixel clock rate, so all of the BLOB statistics are calculated in 1 clock period. In one embodiment, Calculate Statistics 108 outputs BLOB Statistics signal 120, which includes the following signals (which represent statistics value of the pixel on the image), which are illustrated in FIG. 4:

sum_intensity_row=SUM(Pixel_intensity*Row),
sum_intensity_col=SUM(Pixel_intensity*Col),
sum_intensity=SUM(Pixel_intensity),
area=number of pixels in the BLOB,
max_col=largest col number for the BLOB,
min_col=smallest col number for the BLOB,
max_row=largest row number for the BLOB,
min_row=smallest row number for the BLOB,
corners=number of corners that are contained in the BLOB; this is used to approximate the parameter.

Statistics Memory, 110 in FIG. 1, is a variable sized (size selected to be a predetermined value based on camera parameters) flip flop based random access memory. Statistics Memory 110 has a single write line and two read lines. Statistics Memory 110 holds/stores/collects all of the statistics being gathered on each of the active BLOBs. The statistics are accessed as part of one memory location; this way the statistics are updated on each pixel clock. Because the memory used in Statistics Memory 110 is flip flop based, the information written to Statistics Memory 110 can be read on the next clock cycle. This is required because the system clock is equal to the pixel clock.

Based on, (among other things as described infra.), the group type of the current pixel group, Assign ID 102 or Calculate Statistics 108 performs the correlated function described infra.

When the current pixel group presents a group type 0 pixel group situation, Assign ID 102 stores the value of the Current Pixel as the Last Pixel (for use in the analysis of the next Pixel), and moves on to the next pixel. (Recall that the system analyzes pixels in the image frame consecutively across each row and consecutively from the top row to the bottom row. In this particular embodiment, the system analyzes pixels from left to right across a row.)

When the current pixel group presents a group type 1 pixel group situation, Assign ID, 102 in FIG. 1, compares the BLOB ID of the Last Pixel against the ID of the Last Line Pixel. When the pixels IDs are different, then the replace_B_with_A signal is set high. BLOB_ID_B is set equal to the Last Pixel ID and BLOB_ID_A is set equal to the Last Line ID. Assign ID 102 stores 0 as the Last Pixel and moves on.

When the current pixel group presents a group type 2 pixel group situation, Calculate Statistics, 108 in FIG. 1, increments the corner to update the area/size of the BLOB. Assign ID 102 stores the Current Pixel value as the Last Pixel (for use in analysis of the next Pixel), and moves on to analysis of the next pixel.

When the current pixel group presents a group type 3 pixel group situation, the Current Pixel is added to the previously identified BLOB with which it is adjacent; therefore, it is assigned the BLOB ID# of the previously identified BLOB. The statistics values are also updated to include the statistics of the Current Pixel. Assign ID 102 stores the Current Pixel value as the Last Pixel (for use in analysis of the next Pixel), and moves on to analysis of the next pixel.

When the current pixel group presents a group type 4 pixel group situation, the Current Pixel (Pixel 4) is added to the previously identified BLOB with which it is adjacent; therefore, it is assigned the BLOB ID# of the previously identified BLOB. The corner is incremented and the statistics values are updated to include the statistics of the Current Pixel. Assign ID 102 stores the Current Pixel value as the Last Pixel (for use in analysis of the next Pixel), and moves on to analysis of the next pixel.

When the current pixel group presents a group type 5 pixel group situation, a new BLOB is identified/recognized, the Current Pixel is added to the newly identified/recognized BLOB, and the Current Pixel is assigned the BLOB ID# of the newly identified/recognized BLOB. The statistics values are also updated to include the statistics of the Current Pixel. Assign ID 102 stores the Current Pixel value as the Last Pixel (for use in analysis of the next Pixel), and moves on to analysis of the next Pixel.

When the current pixel group presents a group type 6 pixel group situation, the Current Pixel is added to the BLOB to which Last Pixel is assigned; therefore, it is assigned the same BLOB ID# as Last Pixel's BLOB ID#. Assign ID then compares the ID of Last Pixel against the ID of the Last Line Pixel. When the pixels are different, replace_b_with_a is set high. BLOBID_B is set equal to the ID of the Last Line Pixel. The statistics values are updated and the corner count requirements. Assign ID 102 stores the Current Pixel value as Last Pixel and moves on.

The value of the pixels in the Last Line BLOB Info, 112 in FIG. 1, is stored in the format of [[BLOB ID] [Start Col Numb] [End Col Numb]]. So, when the current col is not within the region, it is known there are no BLOBs.

Embodiments of the invention include a "Last Line FIFO", 104 in FIG. 1, configurable logic component, which is an intelligent memory structure that stores BLOB information from the last line (last line meaning the row of pixels immediately above the row in which the Current Pixel is located and all the pixels to the left of Last Pixel (Pixel 3) on the row containing Current Pixel (Pixel 4)) of the image/frame. This block includes the BLOB IDs for the last line of the image. It is responsible for accumulating the BLOBS as they enter this block and grouping them by start column number, end column number, and row. It monitors the BLOB IDs that are in the FIFO and when the ID being pulled ("popped") from the FIFO is the last instance of that ID inside the FIFO then the reuse_id signal 123 is exerted. There are four registers: 1) the FIFO which stores the Row Bit, BLOB ID, Start Column, and end column for the Active BLOBs; 2) address_head (which is the address of the first entry of the FIFO); 3) numb_entries (which tells how long the fifo is and also the location of the tail, i.e., tail=head+numb_entries); and 4) the active BLOBs memory which stores the number of active BLOBs indexed by BLOB ID. In general, the Last Line FIFO, 104 in FIG. 1, includes as input the BLOB Info signal, which includes:

1) "col": the number of the column corresponding to the Current Pixel;
2) "row_bit": one bit to represent the row of the Current Pixel;
3) "replace_b_with_a": a flag to indicate that BLOB ID B needs to be merged/replaced with A;
4) "BLOB_id_a": ID of BLOB a, only used when replace_b_with_a is high;
5) "BLOB_id_b": ID of BLOB b, only used when replace_b_with_a is high;
6) "id_valid": indicates that the data on the input lines is valid;
7) "last_pixel_id": the ID of the previous pixel, used when replace_b_with_a is not high; and
8) "pixel_type": given the pixel groups there are 6 different operations, 0: Do Nothing; 1: Combine when Different; 2: Increment Corner; 3: Update Values; 4: Increment Corner and Update Values; 5: Start New Track; and 6: update values and combine when different.

The Last Line FIFO, 104 in FIG. 1, block includes 2 outputs: 1) last_line_id (shown in the figure as Last Line BLOB Info); and 2) reuse_id. The last_line_id is composed of the row_bit, the stored BLOB ID, starting column number, and ending column number. Embodiments of the invention include generation of a Last Line BLOB Info signal 112, by the Last Line FIFO 104 which consists of two parts: 1) the FIFO entry; and 2) the Last ID Flag. The reuse_id (otherwise referred to in this specification including the claims as the "Last ID Flag") is 1 (or "high") when the stored BLOB ID is the last occurrence of that BLOB ID in the FIFO.

Exemplary Code Used to Determine Reuse_Id and FIFO Control Signals:

```
ShouldWePushOrPull:process(col, head_entry, tail_entry, id_valid,
numb_entries, row_bit, pixel_type)
begin
        merge_to_tail <= '0';
        push_entry <= '0';
        pop_entry <= '0';
        --look at the new pixel
        --Merge it to the tail if it is the same BLOB as the tail entry, but
pixel_type 2 is a special case, the values do not get updated.
        --Push entry if it is not the same as the tail, again pixel_type 2 is
a special case, and so we do not want to push it.
        if((id_valid = '1') and (unsigned(tail_entry(col_size-2
downto 0)) = col-1) and (tail_entry(entry_size-1) = row_bit) and
(pixel_type /= "010")) then
            merge_to_tail <= '1';
        elsif(id_valid = '1') and (pixel_type /= "010") then
            push_entry <= '1';
        end if;
        --look at the head_entry
        if(unsigned(head_entry(col_size-2 downto 0)) = (col) and
(numb_entries /= 0) and (head_entry(entry_size-1) /= row_bit)) then
            pop_entry <= '1';
        end if;
end process ShouldWePushOrPull;
    --reuse_id is active when the number of active BLOBs is going
to be 0 and the entry is set to be poped from the fifo.
    reuse_id <='1' when ((next_active_BLOBs(head_id_value) = 0)
and pop_entry = '1') else '0';
```

Next Active BLOBs includes the new information that will be stored into the Active BLOBs register. When the Current Pixel is active, Last Line FIFO, 104 in FIG. 1, either pushes, pops, or merges to tail. When the column of the Current Pixel is equal to ending column number of the BLOB in FIFO head entry, and the Current Pixel in FIFO is next to a pixel in the same row, then FIFO merges the Current Pixel to tail, meaning that it changes the ending column number of the BLOB to be the column number of the Current Pixel. When the column of the Current Pixel is equal to the ending column number of the BLOB in FIFO head entry, and the Current Pixel in FIFO is not next to a pixel in the same row, then all of the info of the Current Pixel gets pushed to the FIFO tail. When the ending column of the BLOB in FIFO is equal to the current column and not in the same row as head entry, then the FIFO "pop"s the FIFO head entry.

The replace_b_with_a signal is active when the Assign ID module, 102 in FIG. 1, has encountered a Type 1 or Type 6 pixel group and the Last Pixel ID and the Last Line ID is different. When this happens, the last_line_FIFO, 104 in FIG. 1, must replace all occurrences of BLOB ID B with BLOB ID A. This is done in a single clock period. This is unique to this embodiment. For this embodiment the search and replace time is a constant of one clock period.

The code sample demonstrates a situation where replace_A_with_B is active, and entry push entry, and merge to tail are not active. The "for" loop in VHDL (VHSIC (Very High Speed Integrated Circuits) hardware description language) is implemented by copying a hardware block which performs the search each memory location of the flip flop based FIFO. Then the next_active_BLOBS variable is updated to indicate the change in the number of active BLOBS. On the next positive edge of the clock the next_active_BLOBS variable is stored in the Active BLOBs memory. Where the Current Pixel is a group Type 1 situation, Assign ID, 102 in FIG. 1, compares the BLOB ID of the last pixel against the ID of the last line pixel. When the pixels' IDs are different, then the replace_B_with_A signal is set high. BLOB_ID_B is set equal to the Last Pixel ID and BLOB_ID_A Assign ID stores 0 as the last pixel, and moves on.

Sample Code for the Last Line FIFO Block in a Group Type 1 Situation and the Two Active Pixels have a Different ID#:

```
case_input <= replace_b_with_a & pop_entry & push_entry &
  merge_to_tail;
  case case_input is
    when "1000" => --replace_b_with_a
      for i in fifo'range loop
        if(fifo(i)(entry_size-2 downto (2*(col_size-1)))=
        BLOB_id_b) then
          fifo_next_value(i)(entry_size-2 downto
          (2*(col_size-1))) <= BLOB_id_a;
        end if;
      end loop;
      next_active_BLOBs(to_integer(unsigned(BLOB_id_b)))
      <= 0;
      next_active_BLOBs(to_integer(unsigned(BLOB_id_a))) <=
      buffer_active_BLOBs(to_integer(unsigned(BLOB_id_a))) +
      buffer_active_BLOBs(to_integer(unsigned(BLOB_id_b)));
```

Exemplary Analysis of an Exemplary Frame of Video Data

Consider an exemplary analysis of an exemplary frame of video data. Table 2 includes information including some key signals produced based on an analysis of FIG. 1, which depicts an exemplary frame of video data wherein a cross hatching square indicates a pixel that meets the pre-determined threshold and is therefore active, and a white square indicates a pixel that does not meet the predetermined threshold and is therefore inactive.

TABLE 2

Example Data

| Current Pixel Row | Current Pixel Column | Current Pixel (Pixel 4) | Last Pixel (Pixel 3) | Current Pixel BLOB ID (X Represents "Don't Care") | Last Line BLOB Info | | | |
|---|---|---|---|---|---|---|---|---|
| | | | | | BLOB ID | Start Column | End Column | LSB Row | Reuse ID |
| 2 | 2 | 0 | 0 | X | 0 | 0 | 0 | 0 | 0 |
| 2 | 3 | 1 | 0 | 1 | 0 | 0 | 0 | 0 | 0 |
| 2 | 4 | 1 | 1 | 1 | 1 | 2 | 2 | 0 | 0 |
| 2 | 5 | 0 | 1 | X | 1 | 2 | 2 | 0 | 0 |
| 2 | 6 | 0 | 0 | X | 1 | 2 | 2 | 0 | 0 |
| 2 | 7 | 0 | 0 | X | 1 | 2 | 2 | 0 | 0 |
| 3 | 2 | 0 | 0 | X | 1 | 2 | 2 | 0 | 0 |
| 3 | 3 | 0 | 0 | X | 1 | 2 | 2 | 0 | 0 |
| 3 | 4 | 1 | 0 | 1 | 1 | 2 | 2 | 0 | 0 |
| 3 | 5 | 0 | 1 | X | 1 | 2 | 2 | 0 | 0 |
| 3 | 6 | 1 | 0 | 2 | 1 | 3 | 3 | 1 | 0 |
| 3 | 7 | 0 | 1 | X | 1 | 3 | 3 | 1 | 0 |
| 4 | 2 | 0 | 0 | X | 1 | 3 | 3 | 1 | 0 |
| 4 | 3 | 0 | 0 | X | 1 | 3 | 3 | 1 | 0 |
| 4 | 4 | 0 | 0 | X | 1 | 3 | 3 | 1 | 0 |
| 4 | 5 | 1 | 0 | 1 | 1 | 3 | 3 | 1 | 1 |
| 4 | 6 | 1 | 1 | 2 | 2 | 6 | 6 | 1 | 0 |
| 4 | 7 | 0 | 1 | X | 2 | 6 | 6 | 1 | 0 |
| 5 | 2 | 0 | 0 | X | 2 | 5 | 6 | 0 | 0 |
| 5 | 3 | 0 | 0 | X | 2 | 5 | 6 | 0 | 0 |
| 5 | 4 | 0 | 0 | X | 2 | 5 | 6 | 0 | 0 |
| 5 | 5 | 0 | 0 | X | 2 | 5 | 6 | 0 | 0 |
| 5 | 6 | 0 | 0 | X | 2 | 5 | 6 | 0 | 0 |
| 5 | 7 | 0 | 0 | X | 2 | 5 | 6 | 0 | 1 |

As mentioned supra, an active pixel is either assigned a new BLOB ID # or added to a previously established BLOB (therefore assigned a previously generated BLOB ID #). Further, the system, where applicable, merges two BLOBS together, resulting in a single BLOB (a single BLOB ID #), or purges a BLOB, i.e., push a BLOB out of the system.

Note that a pixel is expressed as P(row, column), and more than one pixel can be expressed as P(row:row, column:column), P(row:row, col), or P(row, col:col) indicating an area, a column of pixels, or a row of pixels respectively.

Figure 3:
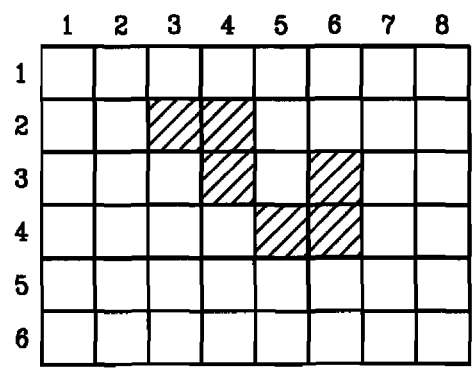
FIG. 3 is a representation of an exemplary binary image/frame.

FIG. 3, columns 1 and 8, and rows 1 and 6, are provided as an example of one column and row surrounding the exemplary frame of video data under analysis. With reference to FIG. 3, row 2 is the first line/row of the image/frame that is analyzed.

The first pixel analyzed is P(2,2). Current Pixel, P(2,2), has passed through the Comparator, 101 in FIG. 1, and has not met the pre-determined threshold value, meaning that its Binary Pixel Value is 0, as is indicated in Table 2 and by the white shading in FIG. 3. As the Last Pixel, P(2,1), is also inactive, Assign ID 102 and Calculate Statistics 108 take no action; the current pixel group presents a group type 0a situation as shown in FIG. 2.

The next pixel analyzed is P(2,3). Current Pixel, P(2,3), has passed through the Comparator, 101 in FIG. 1, and has met the pre-determined threshold value, meaning that its Binary Pixel Value is 1, as is indicated in Table 2 and by the cross hatching in FIG. 3. The Last Pixel, P(2,2), is inactive, meaning the current pixel group presents a group type 5 situation as shown in FIG. 2; therefore, a new BLOB is created in the FIG. 3 illustration of one exemplary image frame rate data when the Current Pixel is P(2,3). The system creates a new BLOB for the Current Pixel P(2,3), and assigns this BLOB a BLOB ID number (for example BLOB ID #1). As the Current Pixel is not next to an active pixel on the same row, the BLOB, through the "BLOB Info" signal, is pushed to the FIFO tail.

The next pixel analyzed is P(2,4). Current Pixel P(2,4) has passed through the Comparator, 101 in FIG. 1, and has met the pre-determined threshold value, meaning that its Binary Pixel Value is 1, as is indicated in Table 2 and by the cross hatching in FIG. 3. The Last Pixel, P(2,3) is active, meaning that the current pixel group presents a group type 3d situation as is shown in FIG. 2. In conformance with Table 2, with a situation type 3d, a pixel is added to a BLOB in which it is adjacent to. This includes pixels which are adjacent in a horizontal direction, in a vertical direction and diagonally. In this case, Pixel P(2,4) is adjacent to active pixel P(2,3), which was assigned BLOB ID #1; therefore P(2,4) is assigned/added to BLOB Id#1 and the statistics are updated. In this situation, replace_b_with_a is inactive. As the Current Pixel, P(2,4), is next to an active pixel, P(2,3), on the same row, then FIFO merges the Current Pixel to the FIFO tail, i.e., changes the ending column number of BLOB having BLOB ID #1.

The next pixel analyzed is pixel P(2,5). Current Pixel, P(2,5), has passed through the Comparator, 101 in FIG. 1, and did not meet the pre-determined threshold value, meaning that its Binary Pixel Value is 0, as is indicated in Table 2 and by the white shading in FIG. 3. As the Current Pixel, P(2,5), is inactive, the Last Pixel, P(2,4), is active, and the Last Line pixels, P(1, 4:5), in the current group are inactive, the current pixel group presents a group type 0c situation as is shown in FIG. 2; therefore, Assign ID 102 and Calculate Statistics 108 take no action.

The remaining pixels on row 2, pixels P(2,6:8) are all inactive, and not next to an active pixel; therefore, the current pixel groups present a group type 0a situation. Therefore, Assign ID 102 and Calculate Statistics 108 take no action.

The first pixel analyzed is pixel P(3,2). Current Pixel, P(3, 2), has passed through the Comparator, 101 in FIG. 1, and did not meet the pre-determined threshold value, meaning that its Binary Pixel Value is 0, as is indicated in Table 2 and by the white shading in FIG. 1. As the Current Pixel, pixel P(3,2), and Last Pixel, pixel P(3,1), are inactive, Assign ID 102 and Calculate Statistics 108 take no action; the current group presents a group type 0a situation as shown in FIG. 2.

The next pixel analyzed is pixel P(3,3). Current Pixel, P(3,3), has passed through the Comparator, 101 in FIG. 1, and did not meet the pre-determined threshold value, meaning that its Binary Pixel Value is 0, as is indicated in Table 2 and by the white shading in FIG. 1. As the Current Pixel, P(3,3), and Last Pixel, P(3,2), are inactive, Assign ID 102 and Calculate Statistics 108 take no action. The current group presents a group type 0a situation as shown in FIG. 2.

The next pixel analyzed is pixel P(3,4). Current Pixel, P(3,4), has passed through the Comparator, 101 in FIG. 1, and met the pre-determined threshold value, meaning that its Binary Pixel Value is 1, as is indicated in Table 2 and by the cross hatching in FIG. 1. As the Current Pixel, P(3,4), is active, the Last Pixel, P(3,3), is inactive, and both last line pixels P(2,3:4) are active, the current pixel group presents a group type 4a situation as shown in FIG. 2; therefore, the Current Pixel, P(3,4), is added to BLOB having BLOB ID #1 (the BLOB with which it is adjacent to and that has been previously identified), the corner is updated, and the statistics are updated.

The next pixel analyzed is pixel P(3,5). Current Pixel, P(3,5), has passed through the Comparator, 101 in FIG. 1, and does not meet the predetermined threshold and is therefore inactive, as is indicated in Table 2 and by the white shading in FIG. 3. As the Current Pixel, P(3,5), is inactive, the Last Pixel, P(3,4) is active, Pixel 1 in the current group, P(2,4), is active, and Pixel 2 in the current group, P(2,5), is inactive, the current pixel group presents a group type 0b situation as described in FIG. 2; therefore, Assign ID 102 and Calculate Statistics 108 take no action.

The next pixel analyzed is pixel P(3,6). Current Pixel, P(3,6), has passed through the Comparator, 101 in FIG. 1, and meets the predetermined threshold and is therefore active, as is indicated in Table 2 and by the cross hatching in FIG. 3. As the Current Pixel, P(3,6), is active, the Last Pixel, P(3,5), is inactive, and both the last line pixels P(2,5:6) are inactive, the current pixel group presents a group type 5 situation as is described in FIG. 2; therefore, a new BLOB is created and is assigned a new ID (for example BLOB ID #2). The next pixel analyzed is pixel P(3,7). Current Pixel, P(3,7), has passed through the Comparator, 101 in FIG. 1, and does not meet the predetermined threshold and is therefore inactive, as is indicated in Table 2 and by the white shading in FIG. 3. As the Current Pixel, P(3,7), is inactive, the Last Pixel is active, and both Last Line pixels, P (2,6:7), are inactive, the current pixel group presents a group type 0c situation; therefore, Assign ID 102 and Calculate Statistics 108 take no action.

The remaining pixels on row 3, pixels P(3,8) are all inactive, and not next to an active pixel; therefore, they are part of a group that presents a situation type 0a; therefore, Assign ID 102 and Calculate Statistics 108 take no action.

The next row analyzed is row 4.

The next pixel analyzed is pixel P(4,2). The Current Pixel, P(4,2), has passed through the Comparator, 101 in FIG. 1, and does not meet the predetermined threshold and is therefore inactive, as is indicated in Table 2 and by the white shading in FIG. 3. As the Current Pixel, P(4,2), is inactive, the Last Pixel, P(4,1), is inactive, and both Last Line pixels, P(3,1:2), are inactive, the current presents group presents a group type 0a situation; therefore Assign ID 102 and Calculate Statistics 108 take no action.

The next pixel analyzed is pixel P(4,3). The Current Pixel, P(4,3), has passed through the Comparator, 101 in FIG. 1, and does not meet the predetermined threshold and is therefore inactive, as is indicated in Table 2 and by the white shading in FIG. 3. As the Current Pixel, P(4,3), is inactive, and the Last Pixel, P(4,2), and both Last Line Pixels, P(3,2:3), are inactive, the current pixel group presents a group type 0a situation; therefore Assign ID 102 and Calculate Statistics 108 take no action.

The next pixel analyzed is P(4,4). The Current Pixel, P(4, 4), has passed through the Comparator, 101 in FIG. 1, and does not meet the predetermined threshold and is therefore inactive, as is indicated in Table 2 and by the white shading in FIG. 3. The Last Pixel, P(4,3), and Last Line Pixel 1, P(3,3), are inactive. The Last Line Pixel 2, P(3,4) is active. Therefore, the current pixel group presents a group type 0a situation. Therefore, Assign ID 102 and Calculate Statistics 108 take no action.

The next pixel analyzed is pixel P(4,5). Current Pixel, P(4,5), has passed through the Comparator, 101 in FIG. 1, and does meet the predetermined threshold and is therefore active, as is indicated in Table 2 and by the cross hatching in FIG. 3. The Last Pixel, P(4,4), and Last Line Pixel 2, P(3,5)

are inactive. Last Line Pixel 1, P(3,4), is active. Therefore, the current pixel group presents a group type 3b situation; as a result, the statistics are updated and the Current Pixel is added to BLOB 1.

The next pixel analyzed is P(4,6). The Current Pixel, P(4,6), has passed through the Comparator, 101 in FIG. 1, and meets the predetermined threshold value and is therefore active, as is indicated in Table 2 and by the cross hatching in FIG. 3. The Last Pixel, P(4,5), and the Last Line Pixel 2, P(3,6), all meet the predetermined threshold value and therefore are active. Last Line Pixel 1, P(3,5), is inactive. This current pixel group presents a group type 6 situation, which calls for incrementing the corner, updating statistics values and combining when there is a different ID. Here, Current Pixel P(4,6) is assigned an ID of 2, and BLOB 1 is merged into BLOB 2, creating a single BLOB.

The next pixel analyzed is pixel P(4,7). The Current Pixel, P(4,7), has passed through the Comparator, 101 in FIG. 1, and does not meet the predetermined threshold and is therefore inactive, as is indicated in Table 2 and by the white shading in FIG. 3. The Last Line Pixel 2, P(3,7) is inactive. Both the Last Line Pixel 1, P(3,6) and the Last Pixel, P(4,6) are active. This current pixel group presents a group type 0b situation and Assign ID 102 and Calculate Statistics 108 take no action.

The remaining pixels on row 4, pixels P(4,8) are all inactive, and not next to an active pixel; therefore, they are part of a group that presents a group type 0a situation; therefore, Assign ID 102 and Calculate Statistics 108 take no action.

The next row analyzed is row 5.

The first pixel analyzed in this row is pixel P(5,2).

Current Pixel, P(5,2) has passed through the Comparator, 101 in FIG. 1, and does not meet the predetermined threshold and is therefore inactive, as is indicated in Table 2 and by the white shading in FIG. 3. All of the pixels in this four pixel group are inactive because they do not meet the predetermined threshold value. This current pixel group presents a group type 0a situation and therefore Assign ID 102 and Calculate Statistics 108 take no action.

The next pixel analyzed is pixel P(5,3). All of the pixels in this current pixel group (Current Pixel, P(5,3), Last Pixel, P(5,2), Last Line Pixel 2, P(4,3), and Last Line Pixel 1, P(4,2)) are inactive. This current pixel group presents a group type 0a situation; therefore Assign ID 102 and Calculate Statistics 108 take no action.

The next pixel analyzed is pixel P(5,4). All of the pixels in this current pixel group (Current Pixel, P(5,4), Last Pixel, P(5,3), Last Line Pixel 2, P(4,4), and Last Line Pixel 1, P(4,3)) are inactive. This current pixel group presents a group type 0a situation; therefore Assign ID 102 and Calculate Statistics 108 take no action.

The next pixel analyzed is pixel P(5,5). Current Pixel, P(5,5), has passed through the comparator and does not meet the predetermined threshold and is therefore inactive, as is indicated in Table 2 and by the white shading in FIG. 3. The Last Pixel, P(5,4), is also inactive; therefore the current pixel group presents a group type 0a situation and therefore Assign ID 102 and Calculate Statistics 108 take no action.

The next pixel analyzed is pixel P(5,6). Current Pixel, P(5,6), has passed through the comparator and does not meet the predetermined threshold and is therefore inactive, as is indicated in Table 2 and by the white shading in FIG. 3. The Last Pixel, P(5,5), is also inactive; therefore the current pixel group presents a group type 0a situation and therefore Assign ID 102 and Calculate Statistics 108 take no action.

The next pixel analyzed is pixel, P(5,7). Here the Current Pixel, P(5,7), has passed through the Comparator, 101 in FIG. 1, and does not meet the predetermined threshold value and is therefore inactive, as is indicated in Table 2 and by the white shading in FIG. 3. As Last Pixel, P(5,6), is inactive, this group presents a group Type 0a situation and therefore Assign ID 102 and Calculate Statistics 108 take no action. As the register pointers are not pointing to any other slots in FIFO having ID #1, and the ending column of the BLOB in FIFO (column 6) is equal to the current column in FIFO (recall that FIFO is one clock tick behind)—column 6—(so pop entry is equal to 1), the reuse_id signal is set active, the BLOB statistics 120 are placed on the Statistics Output signal 121, Output Valid 122 is set active, and the BLOB is purged from the system.

The remaining pixels on row 5, pixels P(5,8), are all inactive, and not next to an active pixel; therefore, they are part of a group that presents a group type 0a; therefore, Assign ID 102 and Calculate Statistics 108 take no action.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A plurality of field programmable gate arrays configured to perform single pass BLOB (Binary Large Objects) analysis on at least one frame of video data, comprising:

receiving said at least one frame of video data from an external source, said at least one frame of video data having a plurality of pixels;

providing for two dimensional processing of said at least one frame of video data so as to define a pixel location for each of the plurality of pixels within said at least one frame of video data;

providing logic signals which indicate an end of a line of video data and an end of said at least one frame of video data;

processing each of said plurality of pixels in said at least one frame of video data in groups of four pixels, wherein a group of four pixels being processed is a current pixel group, each current pixel group consisting of:

a current iteration first pixel contained on a Last Line BLOB Info signal during said current iteration, wherein said current iteration first pixel is immediately above said current iteration Last Pixel;

a current iteration second pixel contained on a Last Line BLOB Info signal during said current iteration, wherein said current iteration second pixel is immediately above said current iteration Current Pixel;

a current pixel group Current Pixel;

and a current pixel group Last Pixel;

determining during a first clock period whether each pixel of said current pixel group is a BLOB pixel of a BLOB by determining whether each pixel of said current pixel group is an active pixel;

determining whether said current pixel group Current Pixel is part of a new BLOB group representing a target distinct from each of any previously identified target, wherein said new BLOB group consists of said Current Pixel, and when it is determined that said current pixel group Current Pixel is part of said new BLOB group:

generating BLOB statistics of said new BLOB group during said first clock period in response to determining that said Current Pixel is part of said new BLOB group during said first clock period, wherein said BLOB statistics of said new BLOB group representing said target distinct from said any previously identified target consists of statistics of said Current Pixel; and determining during said first clock period whether said new BLOB group is not comprised of any additional pixels in said frame of video data;

determining during said first clock period whether said current pixel group Current Pixel is to be treated as an additional member of a pre-existing BLOB group previously identified as representing at least one previously identified target, wherein all pixels of said pre-existing BLOB group are labeled with a group specific ID number, and when it is determined that said current pixel group Current Pixel is to be treated as an additional member of said pre-existing BLOB group:

generating during said first clock period an updated BLOB group representing said at least one previously identified target by assigning said current pixel group Current Pixel said group specific ID number in response to determining that said current pixel group Current Pixel is to be treated as an additional member of said pre-existing BLOB group previously identified as representing said at least one previously identified target, wherein said updated BLOB group representing said at least one previously identified target is formed of all pixels in said pre-existing BLOB group plus said current pixel group Current Pixel, wherein said updated BLOB group is not susceptible to having any of its pixels converted and/or relabeled during said first clock period;

generating BLOB statistics of said updated BLOB group representing said at least one previously identified target during said first clock period;

determining during said first clock period when said updated BLOB group is not comprised of any additional pixels in said frame of video data;

determining during said first clock period whether to merge BLOBs by determining whether said current pixel group Last Pixel and said current iteration first pixel have different BLOB IDs and either said current pixel group Current Pixel is inactive, said current iteration Last Pixel is active, said current iteration second pixel is active, and said current iteration first pixel is inactive, or said current pixel group Current Pixel is active, said current iteration Last Pixel is active, said current iteration second pixel is active, and said current iteration first pixel is inactive, and when it is determined to merge BLOBs:

generating a merged BLOB group during said first clock period by relabeling all pixels having a BLOB ID assigned to said current pixel group Last Pixel prior to relabeling with a BLOB ID of said current iteration first pixel; and calculating BLOB statistics of said merged BLOB.

2. The plurality of field programmable gate arrays of claim 1 wherein said determining when said updated BLOB group is not comprised of any additional pixels in said frame of video data step includes determining that said updated BLOB group is not comprised of any additional pixels in said frame of video data when an ID# in a Last Line FIFO is set to pop entry and Active BLOBs memory at a pointer of the ID # is equal to zero.

3. The plurality of field programmable gate arrays of claim 1, wherein said BLOB statistics of said updated BLOB includes a total area statistic representing total area of said updated BLOB.

4. A plurality of field programmable gate arrays configured to perform single pass BLOB analysis on at least one frame of video data, said single pass BLOB analysis comprising:

receiving said at least one frame of video data from an external source, the at east one frame of video data having a plurality of pixels;

providing for two dimensional processing of the at least one frame of video data so as to define a pixel location for each of the plurality of pixels within the at least one frame of video data;

providing logic signals which indicate an end of a line of video data and an end of the at least one frame of video data;

processing each of the at least one frame of video data having the pixel locations for each pixel within the at least one frame of video data, and the logic signals which indicate the end of the line of video data and the end of the at least one frame of video data;

determining whether a current iteration Current Pixel of a current iteration pixel group is active, wherein said determining whether said current iteration Current Pixel is active step occurs during a single clock period of a current iteration, wherein each of said current iteration pixel group consists of:

said current iteration Current Pixel, a current iteration Last Pixel adjacent to said current iteration Current Pixel, on a same pixel row as said current iteration Current Pixel, and to the left of said current iteration Current Pixel;

a current iteration first pixel contained on said Last Line BLOB Info. signal during said current iteration, wherein said current iteration first pixel is immediately above said current iteration Last Pixel;

a current iteration second pixel contained on a Last Line BLOB Info. signal during said current iteration, wherein said current ration second pixel is immediately above said current iteration Current Pixel;

determining whether said current iteration Last Pixel is active, wherein said determining whether said current iteration Last Pixel is active step occurs during said single clock period of said current iteration;

determining whether said current iteration first pixel is active, wherein said determining whether said current iteration first pixel is active step occurs during said single clock period of said current iteration;

determining whether said current iteration second pixel is active, wherein said determining whether said current iteration second pixel is active step occurs during said single clock period of said current iteration;

determining during said single clock period of said current iteration that said current iteration Current Pixel is part of a pre-existing BLOB group representing a previously identified target when said current iteration Current Pixel is active, said current iteration Last Pixel is inactive, said current iteration second pixel is active, and said current iteration first pixel is inactive;

determining during said single clock period of said current iteration that said current iteration Current Pixel is part of a pre-existing BLOB group representing a previously identified target when said current iteration Current Pixel is active, said current iteration Last Pixel is inactive, said current iteration second pixel is inactive, and said current iteration first pixel is active;

determining during said single clock period of said current iteration that said current iteration Current Pixel is part of said pre-existing BLOB group representing any previously identified target when said current iteration Current Pixel is active, said current iteration Last Pixel is active, said current iteration second pixel is active, and said current iteration first pixel is active;

determining during said single clock period of said current iteration that said current iteration Current Pixel is part of said pre-existing BLOB group representing any previously identified target when said current iteration Current Pixel is active, said current iteration Last Pixel is active, said current iteration second pixel is inactive, and said current iteration first pixel is inactive;

determining during said single clock period of said current iteration that said current iteration Current Pixel is part of said pre-existing BLOB group representing any previously identified target when said current iteration Current Pixel is active, said current iteration Last Pixel is inactive, said current iteration second pixel is active, and said current iteration first pixel is active;

determining during said single clock period of said current iteration that said current iteration Current Pixel is part of said pre-existing BLOB group representing any previously identified target when said current iteration Current Pixel is active, said current iteration Last Pixel is active, said current iteration second pixel is inactive, and said current iteration first pixel is active;

determining during said single clock period of said current iteration that said current iteration Current Pixel is part of said pre-existing BLOB group representing any previously identified target when said current iteration Current Pixel is active, said current iteration Last Pixel is active, said current iteration second pixel is active, and said current iteration first pixel is inactive;

determining during said single clock period that two BLOBs should be merged by determining that said BLOB ID of said current iteration Last Pixel is different than said current iteration second pixel by comparing a BLOB ID of said current iteration Last Pixel to said current iteration second pixel when said current iteration Current Pixel is inactive, said current iteration Last Pixel is active, said current iteration second pixel is active, and said current iteration first pixel is inactive;

relabeling during said single clock period all pixels assigned said BLOB ID of said current iteration Last Pixel with said BLOB ID of said current iteration second pixel in response to determining that said BLOB ID of said current iteration Last Pixel is different than said current iteration second pixel and said current iteration Current Pixel is inactive, said current iteration Last Pixel is active, said current iteration second pixel is active, and said current iteration first pixel is inactive;

determining during said single clock period that two BLOBs should be merged by determining that said BLOB ID of said current iteration Last Pixel is different than said current iteration second pixel by comparing said BLOB ID of said current iteration Last Pixel to said current iteration second pixel when said current iteration Current Pixel is active, said current iteration Last Pixel is active, said current iteration second pixel is active, and said current iteration first pixel is inactive;

relabeling during said single clock period all pixels assigned said BLOB ID of said current iteration Last Pixel with said BLOB ID of said current iteration second pixel in response to determining that said BLOB ID of said current iteration Last Pixel is different than said current iteration second pixel and said current iteration Current Pixel is active, said current iteration Last Pixel is active, said current iteration second pixel is active, and said current iteration first pixel is inactive.

5. The method of claim 4, further comprising:

updating an area statistic of said pre-existing BLOB group during said single clock period by adding an area of said Current Pixel to said pre-existing area value in response to determining that said current iteration Current Pixel is active, said current iteration Last Pixel is inactive, said current iteration second pixel is active, and said current iteration first pixel is inactive when it has been determined that said current iteration Current Pixel is active, said current iteration Last Pixel is inactive, said current iteration second pixel is active, and said current iteration first pixel is inactive;

updating said area statistic of said pre-existing BLOB group during said single clock period by adding said area of said Current Pixel to said pre-existing area value in response to determining that said current iteration Current Pixel is active, said current iteration Last Pixel is inactive, said current iteration second pixel is inactive, and said current iteration first pixel is active when it has been determined that said current iteration Current Pixel is active, said current iteration Last Pixel is inactive, said current iteration second pixel is inactive, and said current iteration first pixel is active;

updating said area statistic of said pre-existing BLOB group during said single clock period by adding said area of said Current Pixel to said pre-existing area value in response to determining that said current iteration Current Pixel is active, said current iteration Last Pixel is active, said current iteration second pixel is active, and said current iteration first pixel is active when it has been determined that said current iteration Current Pixel is active, said current iteration Last Pixel is active, said current iteration second pixel is active, and said current iteration first pixel is active;

updating said area statistic of said pre-existing BLOB group during said single clock period by adding said area of said Current Pixel to said pre-existing area value in response to determining that said current iteration Current Pixel is active, said current iteration Last Pixel is active, said current iteration second pixel is inactive, and said current iteration first pixel is inactive when it has been determined that said current iteration Current Pixel is active, said current iteration Last Pixel is active, said current iteration second pixel is inactive, and said current iteration first pixel is inactive;

updating said area statistic of said pre-existing BLOB group during said single clock period by adding said area of said Current Pixel to said pre-existing area value in response to determining that said current iteration Current Pixel is active, said current iteration Last Pixel is inactive, said current iteration second pixel is active, and said current iteration first pixel is active when it has been determined that said current iteration Current Pixel is active, said current iteration Last Pixel is inactive, said current iteration second pixel is active, and said current iteration first pixel is active; and updating said area statistic of said pre-existing BLOB group during said single clock period by adding said area of said Current Pixel to said pre-existing area value in response to determining that said current iteration Current Pixel is active, said current iteration Last Pixel is inactive, said current iteration second pixel is active, and said current iteration first pixel is active when it has been determined that said current iteration Current Pixel is active, said current iteration Last Pixel is active, said current iteration second pixel is inactive, and said current iteration first pixel is active.

* * * * *